No. 786,767.

Patented April 4, 1905.

UNITED STATES PATENT OFFICE.

PAUL JULIUS AND ERNST FUSSENEGGER, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

BLUE-RED AZO DYE.

SPECIFICATION forming part of Letters Patent No. 786,767, dated April 4, 1905.

Application filed November 17, 1904. Serial No. 233,176.

*To all whom it may concern:*

Be it known that we, PAUL JULIUS and ERNST FUSSENEGGER, subjects of the Emperor of Austria-Hungary, residing at Ludwigshafen-on-the-Rhine, in the Kingdom of Bavaria, in the German Empire, have invented new and useful Improvements in Azo Coloring-Matter, of which the following is a specification.

This invention relates to the production of azo coloring-matter. We have discovered that a new and valuable azo coloring-matter which in the form of its lakes is characterized by its fastness against the action of light and which also possesses beautiful bluish-red shades can be obtained from 3.4.6-trichlor-anilin and beta-naphthol-disulfo-acid R. The trichlor-anilin which is used in our invention can be obtained according to the process described by Lesimple, (*Annalen* 137, p. 125.)

The following example will serve to further illustrate the nature of our invention, which, however, is not confined to this example. The parts are by weight.

Introduce one hundred and ninety-six and a half (196.5) parts of 3.4.6-trichlor-anilin while stirring at a temperature of from five to ten degrees centigrade (5-10° C.) into the quantity of nitrosyl-sulfuric acid which is theoretically sufficient to produce the diazo compound and then stir for two (2) hours at the same temperature. After this pour the mixture onto ice and then allow the clear diazo solution so obtained to run while stirring into a solution of three hundred and fifty (350) parts of the sodium salt of beta-naphthol-3.6-disulfo-acid, to which also sufficient sodium carbonate has been added to maintain the whole alkaline. Stir for half an hour and then warm to a temperature of from sixty to seventy degrees centigrade (60-70° C.) and filter off and press and dry.

The new azo coloring-matter is soluble in water and forms a bluish-red barium-aluminium lake. Upon reduction with tin and hydrochloric acid it yields 3.4.6-trichlor-anilin and amido-naphthol-disulfo-acid.

What we claim is—

As a new article of manufacture the azo coloring-matter which can be obtained by combining diazotized 3.4.6-trichlor-anilin with beta-naphthol-disulfo-acid R, which coloring-matter is soluble in water, which in the form of its barium-aluminium lake possesses a bluish-red color, and which on reduction with tin and hydrochloric acid yields 3.4.6-trichlor-anilin and amido-naphthol-disulfo-acid.

In testimony whereof we have hereunto set our hands in the presence of two subscribing witnesses.

PAUL JULIUS.
ERNST FUSSENEGGER.

Witnesses:
ERNEST F. EHRHARDT,
J. ALEC. LLOYD.